April 20, 1926.

E. C. JONES

AUTOMATIC EXHIBITOR

Filed March 30, 1921 4 Sheets-Sheet 1

1,581,127

Inventor
Edgar C. Jones
By Robert M. Zacharias.
Atty

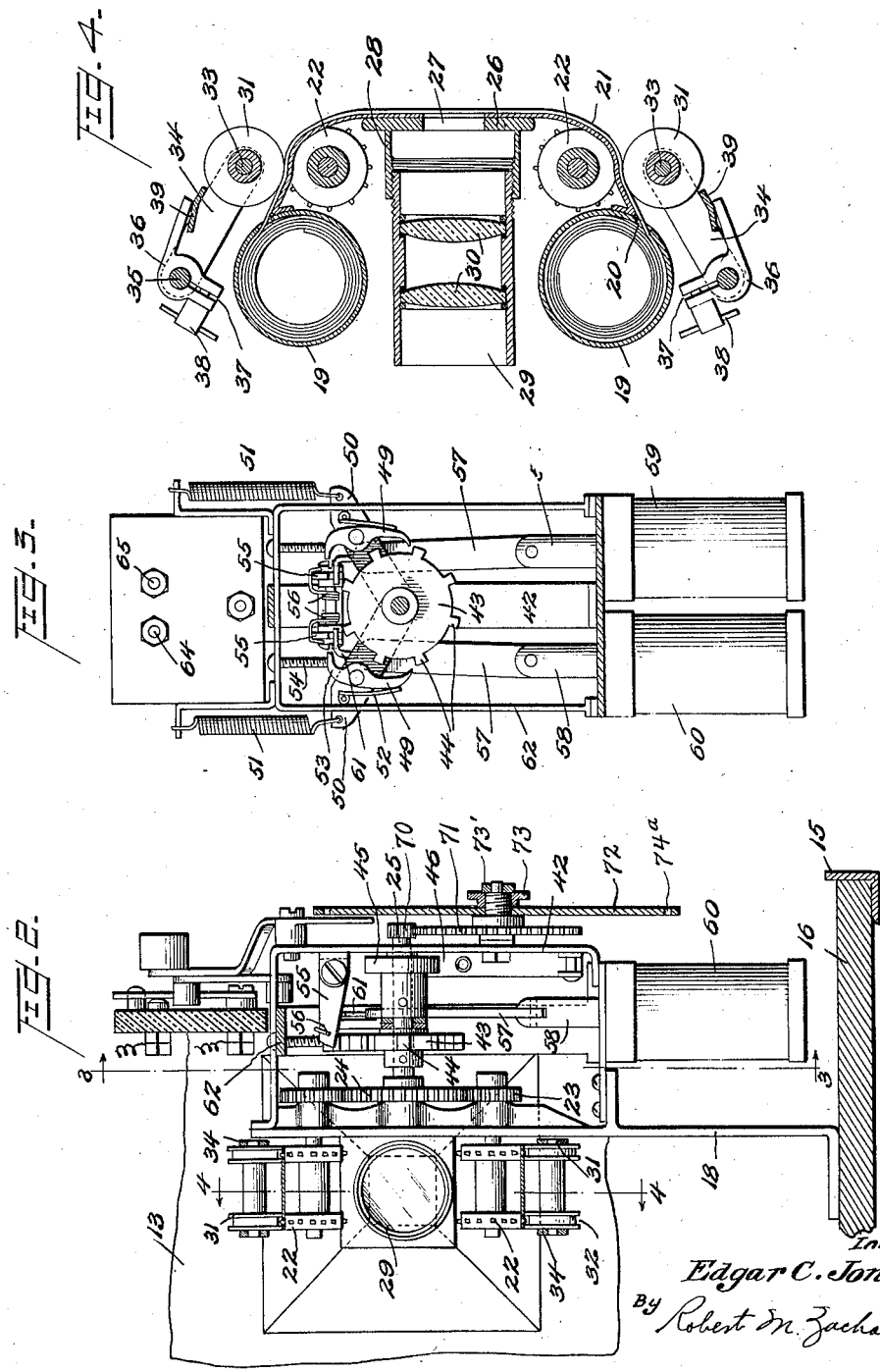

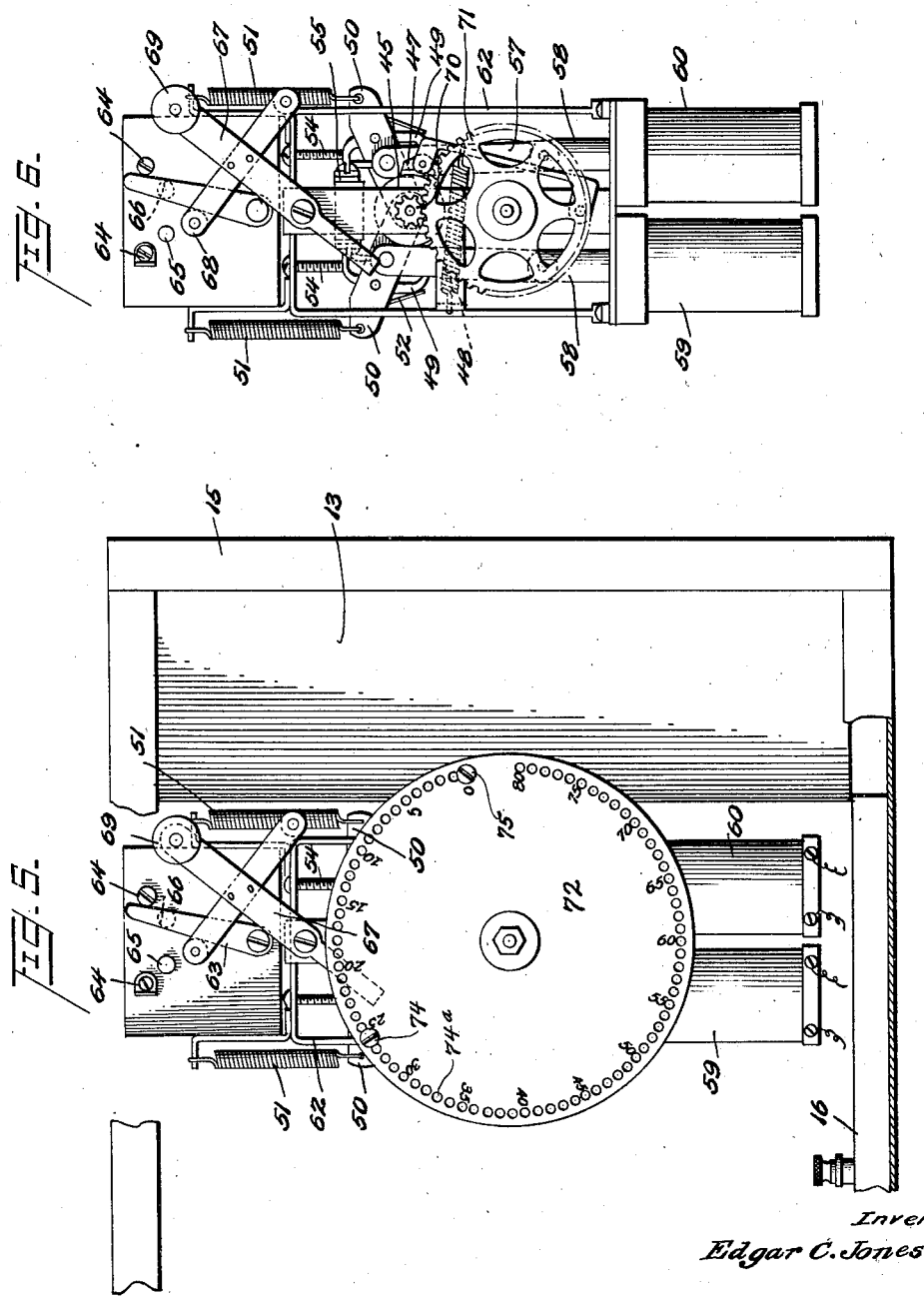

April 20, 1926.  
E. C. JONES  
AUTOMATIC EXHIBITOR  
Filed March 30, 1921   4 Sheets-Sheet 4

1,581,127

Inventor  
Edgar C. Jones  
By Robert M. Zacharias.  
Att'y

Patented Apr. 20, 1926.

1,581,127

UNITED STATES PATENT OFFICE.

EDGAR C. JONES, OF WASHINGTON, DISTRICT OF COLUMBIA.

AUTOMATIC EXHIBITOR.

Application filed March 30, 1921. Serial No. 456,814.

*To all whom it may concern:*

Be it known that I, EDGAR C. JONES, a citizen of the United States, and a resident of Washington, in the District of Columbia, have invented certain new and useful Improvements in Automatic Exhibitors, of which the following is a specification.

This invention relates to apparatus for projecting enlarged images on a suitable screen for advertising or similar purposes, and has as one of its objects the provision of suitable mechanism for this purpose and the compact arrangement of such mechanism in a casing in such a manner that the enlarged images may be projected upon a translucent screen which constitutes one wall of the casing, so that the whole apparatus may be readily moved from place to place.

Another object of the invention is the provision of apparatus of this kind by which the images displayed will be automatically changed at predetermined intervals of time.

A further object is the provision of apparatus for automatically changing the the images displayed which will permit the images to be changed at will, independently of the automatic operation.

A still further object of the invention is the provision of suitable means for automatically reversing the direction of motion of an image-bearing strip.

A still further object is the provision in apparatus of this kind of suitable means for holding the image-bearing strip in the position to which it is operated.

Still further objects of the invention and features of novelty will be apparent from the following specification when taken in connection with the accompanying drawings, in which:

Fig. 2 is a fragmentary vertical section on line 2—2 of Fig. 1, showing the film advancing mechanism;

Fig. 3 is a fragmentary vertical section on line 3—3 of Fig. 2;

Fig. 4 is a vertical section on line 4—4 of Fig. 2;

Fig. 5 is a fragmentary side elevation of part of the structure shown in Fig. 1, showing the mechanism for reversing the strip advancing mechanism;

Fig. 6 is a fragmentary side elevation similar to Fig. 5, certain parts being removed to more clearly disclose the strip advancing mechansm;

Figure 1:
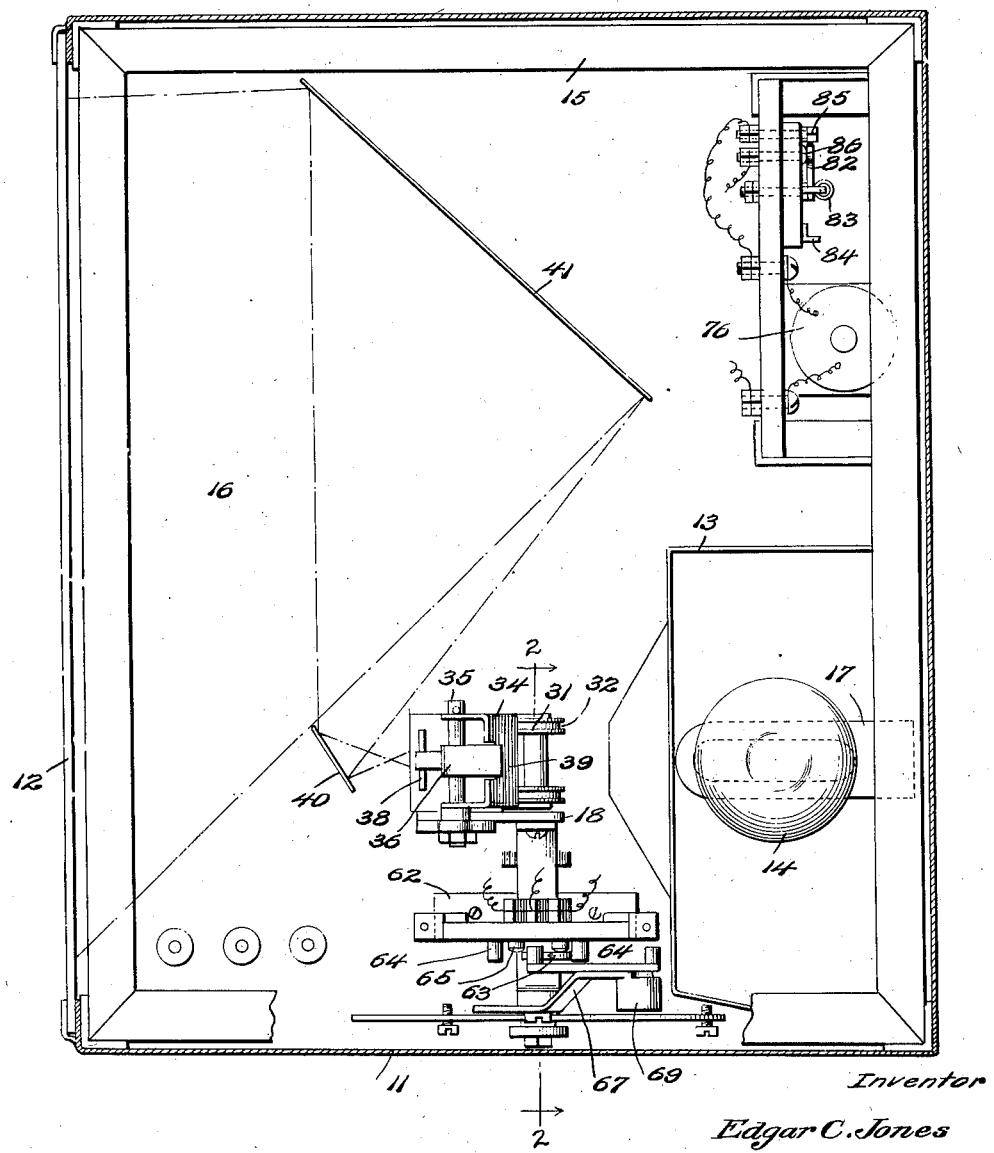
Fig. 1 is a plan view of a structure embodying the invention, the top of the casing being broken away.

In the embodiment of the invention shown in the drawings, the casing in which the projecting apparatus is contained is indicated at 11, a ground glass 12 or other suitable translucent screen constituting a front wall for the casing, and being preferably carried by a frame which is hinged to the body of the casing to provide for access to the interior thereof when it is desired to change the strip or adjust the mechanism.

Within the casing 11 is the lamp housing 13, preferably arranged in one corner thereof, and the casing 11 is preferably formed with suitable openings at the top and bottom of the housing 13 to provide for ventilation of the air heated by the lamp 14. The casing 11 may, if desired, be reinforced with an interior frame 15, as shown, and a baseboard 16 may be supported in the casing to carry the bracket 17, to which the lamp 14 is adjustably secured, and the various operating devices.

Mounted on the base 16 is a bracket 18 which carries receptacles 19 which are slotted as shown at 20, and are so arranged that an image bearing strip such as a photographic film 21 may be fed from one to the other receptacle so as to curl up and be housed therein. Feed rolls or sprockets 22, adjacent the receptacles 19, are supported on the bracket 18, and gears 23 are provided for driving the feed sprockets, both gears being in mesh with a gear 24, which is mounted on a shaft 25. A member 26 is carried by the bracket 18 between the feed sprockets 22, being preferably provided with a guide plate which extends from one receptacle 19 to the other to support the film, and it is formed with a projection opening 27 and a tubular extension 28 to which the lens holder 29 is threaded, so that the axis of lenses 30 therein will register with the center of the projection opening 27 and the lamp 14. Rollers 31, grooved as shown at 32, are provided for cooperation with feed sprockets 22, these rollers being mounted in pairs on pins 33, which are supported at their ends in frames 34, which are adapted to swing about pins 35, carried by the bracket 18. Detents 36, split as shown at 37 and provided with thumb screws 38 by which they may be clamped in position on the pins 35, are provided to releasably hold the frames 34 in position, the frames 34 having cross members 39, which may be resilient if desired, and which are engaged by arms on the detents 36. A small mirror 40 is suitably supported in front of the objective lenses 30 and is adapted to reflect the diverging rays, as indicated in Fig. 1, to a larger mirror 41, by which the rays are again reflected to the screen 12. The arrangement of the lenses 30 and the mirrors 40 and 41 is such that the image on the screen 12 will be an undistorted enlargement of the image on the film.

The shaft 25 which carries gear 24 is journaled in bracket 18 and in a support 42, carried thereby, and mounted on the shaft between the bracket and the support 42 are a wheel 43, having teeth 44 thereon, and a cylindrical member 45, which may be integral with the wheel 43, if desired. A brake member 46 is pivotally mounted on the support 42 and has a shoe 47, adapted to be held by a spring 48 against the cylindrical member 45 on the shaft 25.

Pawls 49, for engaging the teeth 44 of the wheel 43, are pivotally mounted on arms 50 which are journaled on shaft 25 and provided with springs 51, by which they are normally held in upper position. The arms 50 also carry springs 52 which tend to hold the pawls 49 in tooth-engaging position, but the pawls are normally held out of the path of the teeth 44 by the engagement of extensions 53 on the pawls with stops 54 which are suitably supported on the bracket 18. Stop members 55 are pivotally carried by the support 42 and provided with springs 56 which tend to hold them in the path of the teeth 44 of the wheel 43. The arms 50 are connected by links 57 to the armatures 58 of electromagnets 59 and 60, and the links 57 carry fingers 61 which normally are held, by the action of springs 51, in engagement with the stop members 55 to hold them out of the path of the teeth 44. It will be apparent that, upon energization of either electromagnet 59 or 60, the corresponding arm 50 will be swung downwardly against the action of its spring 51, the pawl 49 thereon will be forced by spring 52 into tooth engaging position as soon as the pawl leaves stop 54, and wheel 43 will be rotated one step until the pivoted stop member 55, released by finger 61 and forced by spring 56 into the path of the teeth 44, is engaged by the next tooth. It will also be apparent that the mechanism for operating the wheel 43 in either direction is normally in such position as not to interfere with operation in the opposite direction, and that the wheel 43 will be frictionally held in the position to which it has been moved, so that the film will be retained in its position with reference to the projection opening 27.

Mechanism for recording the direction of motion of the film is suitably mounted on the bracket 18 and another bracket 62 which is secured thereto, and includes a contact arm 63 operable between stops 64 to make electrical connection with either contact 65 or contact 66 which are electrically connected, respectively, with the electromagnets 59 and 60. A lever 67 is pivotally mounted on the support 42 and carries laterally spaced lugs or rollers 68 for engaging and operating contact member 63, a weight 69 being provided on the lever 67 so that when the lever is moved beyond vertical position the weight will complete the movement to snap the contact arm 63 to alternate position and hold it in such position.

A gear 70 on the shaft 25 meshes with a gear 71 which is suitably mounted on the support 42, and a disk 72 is secured in any suitable manner, as by nut 73 and lock nut 73', to the gear 71 so as to be driven therewith upon rotation of the shaft 25. Adjacent its periphery, the disk 72 is formed with a series of threaded openings 74$^a$ to receive screws 74 and 75 which extend through the disk to engage a downwardly extending arm of the lever 67. The openings 74$^a$ are spaced to correspond to the amount of motion of the disk when the film is advanced one step, and it will be apparent that the screws 74 and 75 may be so located as to effect operation of the contact member 63 by the lever 67 to reverse the direction of motion of the film as desired.

Figure 7:
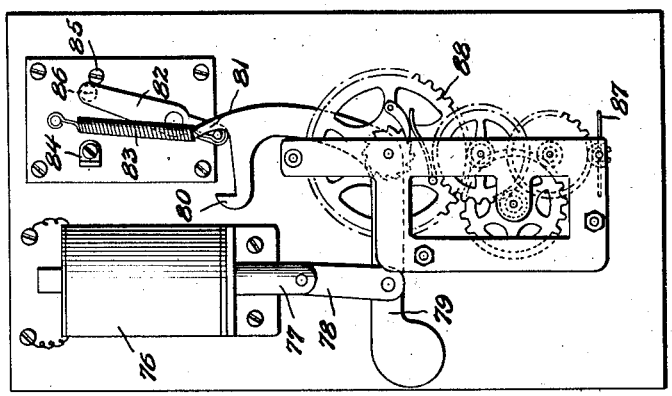
Fig. 7 is a view in elevation of the timing device shown in Fig. 1.

Mechanism for automatically and periodically energizing one or the other of the electromagnets 59 and 60 through contact member 63 is suitably mounted in the casing 11 and, as shown in Figs. 1 and 7, includes an electromagnet 76 having an armature 77 connected by link 78 to a weighted lever 79 which bears spaced lugs 80 and 81 arranged to operate a contact arm 82 to and from circuit closing position. The contact arm 82 is preferably provided with a spring 83 which holds it either against a stop 84 or against a contact stop 85, in which latter position it completes a circuit through electromagnet 76, and also engages a contact 86 which is connected to contact arm 63 to effect energization of one of electromagnets 59 or 60. Upon being raised by electromagnet 76, the weighted lever 79 tends to move to the position shown in Fig. 7, but such movement is retarded by suitable mechanism shown herein as a vane 87, connected by a train of gearing 88 to the lever 79. As the lever 79 approaches the position shown in Fig. 7, the lug 81 thereon will throw contact arm 82 over center, whereupon spring 83 will move the arm to engage contact 86, thereby energizing one electromagnet of the film advancing mechanism, and to almost simultaneously engage contact stop 85 to energize electromagnet 76, which through lever 79 and lug 80 moves contact arm 82 to break its own circuit and that of the electromagnet of the film advancing mechanism.

Figure 8:
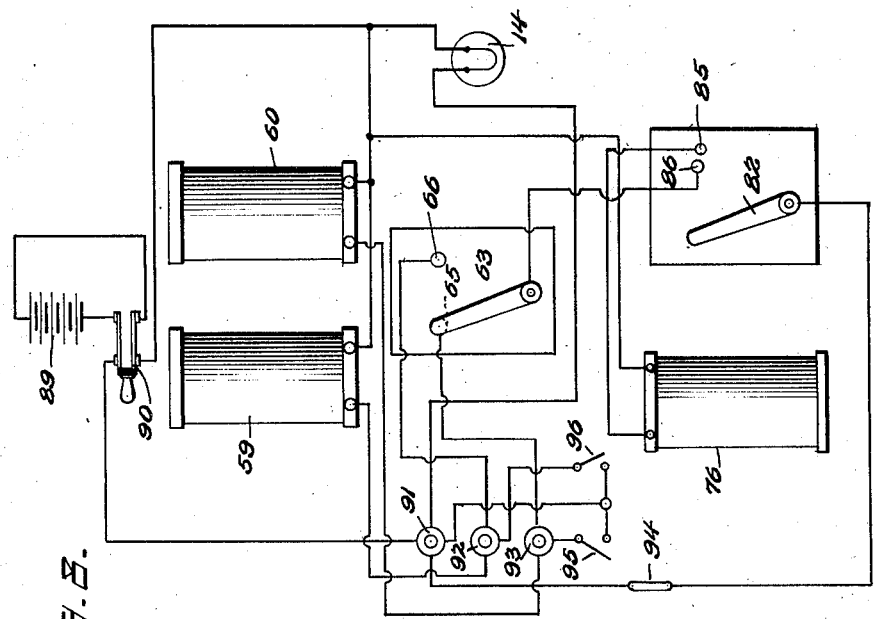
Fig. 8 is a diagrammatic view of the electrical circuits of the structure shown in Fig. 1.

The various devices are electrically connected, as shown diagrammatically in Fig. 8, to a suitable source of current 89, such connection preferably including a switch 90, to control operation of the apparatus as a whole. Binding posts 91, 92 and 93 may be used to facilitate connection of the various devices, and a switch 94 is inserted in the connection from the source 89 to the intermittently operated contact 82, so that when such switch is open the electromagnet 76 cannot be energized. Switches 95 and 96 are suitably connected to the source 89 and to the electromagnets 59 and 60, respectively, so that the electromagnets 59 and 60 can be energized and the film operated in one direction or the other at will.

Since the electromagnets 59, 60 and 76 are energized only momentarily they may be readily designed for operation by either direct or alternating current at the voltages usually employed for lighting circuits in stores and street cars. If the apparatus is to be used for advertising in store windows or similar places the casing 11 may be provided with a suitable handle to facilitate transportation from place to place, and if it is to be used on street cars for displaying the names of streets or advertising matter, the casing 11 may be provided with means for attaching it to suitable supports on the car.

The apparatus described provides for the efficient display of enlargements of the images on a film, is light in weight and occupies small space, practically the whole front of the casing being utilized as a screen.

Provision is also made whereby the film may be moved in either direction, either in addition to or instead of the movements effected periodically by electromagnet 76 and the parts controlled thereby, and the parts of the apparatus are so designed that it may be readily adapted to a great variety of uses and conditions.

While one embodiment of the invention has been illustrated and described, it will be understood that many changes may be made in the details of construction without departing from the spirit of the invention which is defined in the following claims.

The invention having thus been described, what I claim is:

1. In a character projecting device, the combination of a source of light, means for feeding a strip across the path of rays of light from said source, means for operating said strip-feeding means in opposite directions comprising a pair of electromagnets, automatic means for periodically energizing one or the other of said electromagnets, and means controlled by motion of said strip-feeding means for shifting the connection of said automatic means from the one to the other of said electromagnets to reverse the direction of motion of said strip.

2. In a character projecting device, the combination of a source of light, means for feeding a strip across the path of rays of light from said source, electromagnetic means for operating said strip-feeding means, and automatic means for periodically energizing said electromagnetic means comprising an electromagnet, a member controlled thereby for breaking the circuits to said electromagnetic means and to said electromagnet, and means for retarding the motion of said member to position in which it effects the closing of said circuits.

3. In a character projecting device, the combination of a source of light, means for feeding the strip across the path of rays of light from said source, electromagnetic means for operating said strip-feeding means, and automatic means for periodically energizing said electromagnetic means comprising an electromagnet, and means operable upon energization of said electromagnet for breaking the circuits of said electromagnet and of said electromagnetic means.

4. In a character projecting device, the combination of a source of light, means for feeding a strip across the path of rays of light from said source, means for operating said strip-feeding means in opposite directions comprising a pair of electromagnets, automatic means for periodically energizing one or the other of said electromagnets, and means for energizing said electromagnets independently of said automatic means.

5. In a character projecting device, the combination of a source of light and means for intermittently advancing a strip a predetermined distance across the path of rays of light from said source comprising mechanism for driving the strip, brake means frictionally opposing the operation of said mechanism, a pair of electromagnets, and means operable by one or the other of said electromagnets for operating said mechanism.

6. In a character projecting device, the combination of a source of light, mechanism for advancing a strip a predetermined distance across the path of rays of light from said source, means for automatically and periodically operating said strip-advancing mechanism, said operating means being normally disconnected from said strip-advancing mechanism, and braking means for frictionally holding said strip from movement between successive operations.

In testimony whereof I affix my signature.

EDGAR C. JONES.